United States Patent
Tsai

(10) Patent No.: US 6,383,325 B1
(45) Date of Patent: May 7, 2002

(54) METHOD FOR MANUFACTURING A POLYURETHANE PRODUCT WITH HIGH WETTING ABILITY, GAS PERMEABILITY AND HIGH WATER REPELLENT ABILITY BY A DRY TRANSFER COATING PROCESS

(76) Inventor: Chai-Bang Tsai, No. 202, Chang-Ho Road, Sec. 3, Ho-Mei Chen, Chang-Hua Hsien (TW)

( * ) Notice: Subject to any disclaimer, the term of this patent is extended or adjusted under 35 U.S.C. 154(b) by 0 days.

(21) Appl. No.: 09/568,416

(22) Filed: May 10, 2000

(51) Int. Cl.⁷ .................. B32B 31/12; B32B 31/22; D06N 3/00
(52) U.S. Cl. .......... 156/237; 156/231; 156/238; 156/239; 156/247; 156/278; 156/246
(58) Field of Search .................. 156/230, 231, 156/237, 238, 239, 247, 278, 246; 428/904

(56) References Cited

U.S. PATENT DOCUMENTS

| | | | |
|---|---|---|---|
| 3,607,522 A | * 9/1971 | Phillips, Jr. ............. | 156/247 X |
| 3,861,937 A | * 1/1975 | Hanneken et al. ...... | 156/247 X |
| 3,871,938 A | * 3/1975 | Takahasi et al. ........ | 156/247 X |
| 3,873,406 A | * 3/1975 | Okazaki et al. ......... | 156/237 X |
| 3,908,060 A | * 9/1975 | Okazaki et al. ......... | 428/904 X |
| 3,941,633 A | * 3/1976 | Wang et al. ............. | 156/246 X |
| 3,959,049 A | * 5/1976 | Tanaka et al. .......... | 156/246 X |
| 4,218,505 A | * 8/1980 | Shiga et al. ............. | 428/904 X |
| 4,341,581 A | * 7/1982 | Civardi et al. | |
| 4,363,686 A | * 12/1982 | Komarek ................. | 156/246 X |
| 4,487,642 A | * 12/1984 | Takashima et al. ...... | 156/231 X |
| 4,539,056 A | * 9/1985 | Takeshita et al. | |
| 4,569,712 A | * 2/1986 | Shibano et al. | |
| 4,614,671 A | * 9/1986 | Wong | |
| 5,484,646 A | * 1/1996 | Mann | |
| 6,306,236 B1 | * 10/2001 | Takeshita et al. ........ | 156/247 X |

FOREIGN PATENT DOCUMENTS

| | | | |
|---|---|---|---|
| JP | 81011790 B | * | 3/1981 |
| JP | 62-231088 A | * | 10/1987 |
| JP | 2-191777 A | * | 7/1990 |
| JP | 4-333675 A | * | 11/1992 |
| TW | 218901 A | * | 1/1994 |
| TW | 275637 A | * | 5/1996 |

* cited by examiner

Primary Examiner—Curtis Mayes
(74) Attorney, Agent, or Firm—Rosenberg, Klein & Lee

(57) ABSTRACT

A method for manufacturing a P.U. product includes a front stage working, and a rear stage working. The front stage working includes: coating a first P.U. liquid on a releasing sheet to form a first P.U. surface layer, coating a second P.U. liquid on the first P.U. surface layer to form a second P.U. surface layer, bonding a substrate cloth on the second P.U. surface layer, thereby forming a first product which includes the first P.U. surface layer, the second P.U. surface layer, and the substrate cloth. The rear stage working includes: rolling a first mixing liquid on the first product to form a plurality of intensive small air vents in the second P.U. surface layer for increasing permeability, rolling a second mixing liquid containing a fluoride on the first product so that the fluoride infiltrates through the first and second P.U. surface layer for increasing a water repellent function, and rolling a third mixing liquid containing a P.U. solvent on the first product to increase comfort and quality of the first product, thereby making a final product.

15 Claims, 5 Drawing Sheets

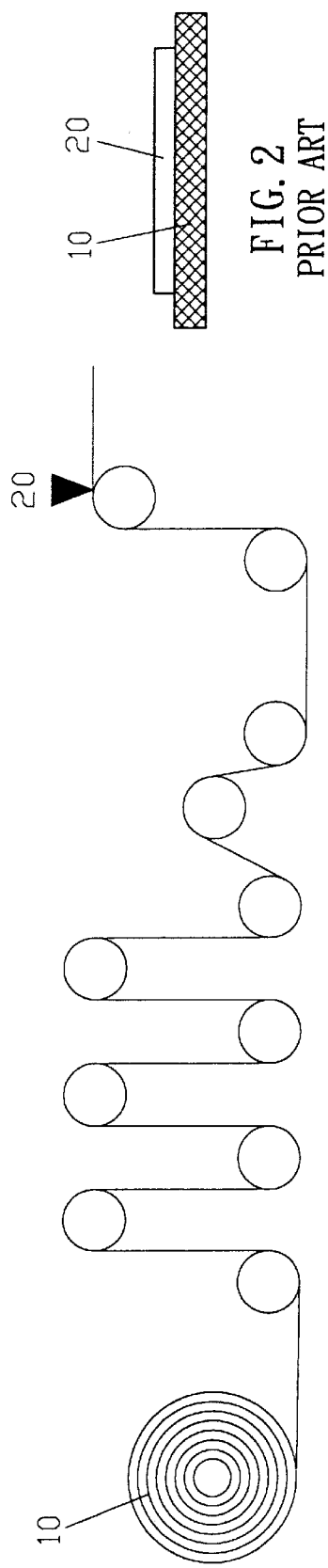
FIG. 1
PRIOR ART
FIG. 2
PRIOR ART
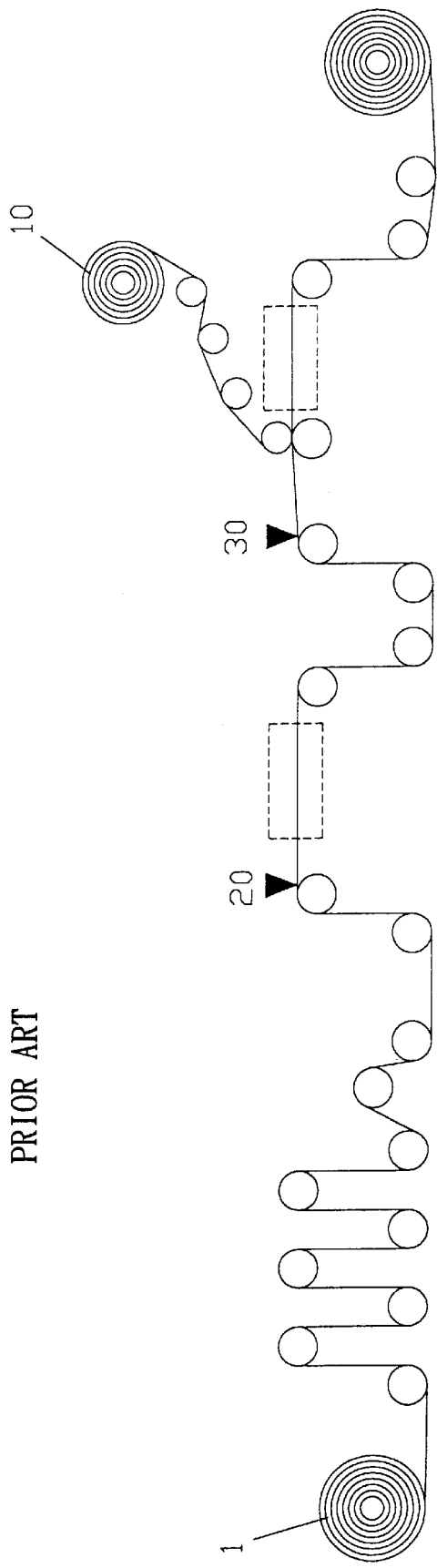
FIG. 3
PRIOR ART

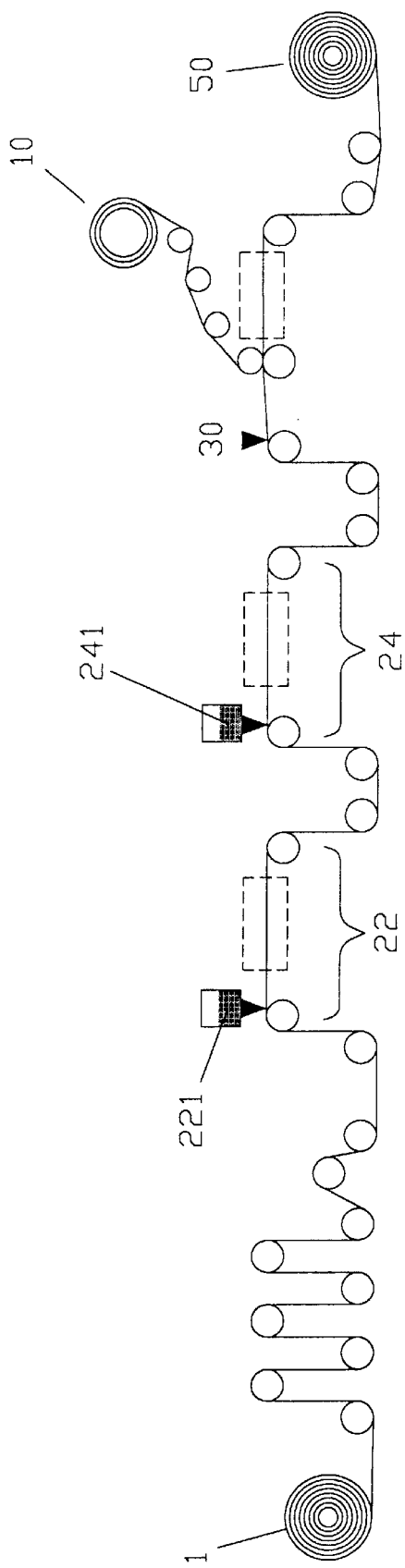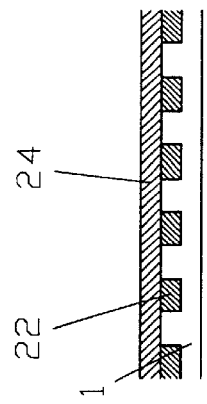
FIG. 5
FIG. 5A
FIG. 5B

METHOD FOR MANUFACTURING A POLYURETHANE PRODUCT WITH HIGH WETTING ABILITY, GAS PERMEABILITY AND HIGH WATER REPELLENT ABILITY BY A DRY TRANSFER COATING PROCESS

BACKGROUND OF THE INVENTION

1. Field of the Invention

The present invention relates to a method for manufacturing a polyurethane (P.U.) product with high wetting ability, gas permeability and high water repellent ability by means of a dry transfer coating process.

2. Description of the Related Art

A conventional dry type direct coating method in accordance with the prior art shown in FIGS. 1 and 2 is used for manufacturing a synthetic cloth and comprises directly coating a P.U. surface layer 20 on a substrate cloth 10 which is a knitting cloth, a non-woven cloth, intersecting knitting cloth or the like, thereby making the synthetic cloth which includes the P.U. surface layer 20 and the substrate cloth 10 as shown in FIG. 2. In such a manner, a film layer with small apertures is formed on the substrate cloth 10 for increasing the gas permeability of the synthetic cloth, wherein the wetting ability of the synthetic cloth is about 1500 to 2000 g/SQMD. However, the P.U. surface layer 20 cannot be formed with proper patterns so as to fit the different requirements of the consumers, thereby limiting the versatility of the synthetic cloth.

A conventional wet type transfer coating method in accordance with the prior art shown in FIGS. 3 and 4 is used for manufacturing a synthetic cloth and comprises the following steps. First, a P.U. surface layer 20 is coated on a releasing sheet 1, and is then baked and dried. A bonding agent 30 is then bonded on the P.U. surface layer 20 for bonding a substrate cloth 10 to the P.U. surface layer 20. The substrate cloth 10 is a knitting cloth, a non-woven cloth, intersecting knitting cloth or the like. The bonding agent 30 is then baked and dried, and the releasing sheet 1 is then removed from the P.U. surface layer 20, thereby forming the final synthetic cloth which includes the P.U. surface layer 20, the bonding agent 30, and the substrate cloth 10 as shown in FIG. 4. A plurality of small apertures are formed in the P.U. surface layer 20 for increasing the gas permeability of the synthetic cloth, wherein the wetting ability of the synthetic cloth is decreased to about 650 g/SQMD. In such a manner, the patterns on the releasing sheet 1 is printed on the P.U. surface layer 20 by a transfer type. However, the wetting ability and gas permeability of the synthetic cloth are decreased.

SUMMARY OF THE INVENTION

In accordance with one aspect of the present invention, there is provided a method for manufacturing a polyurethane (P.U.) product with high wetting ability, gas permeability and high water repellent ability by means of a dry transfer coating process. The method comprises a front stage working, and a rear stage working.

The front stage working includes the steps of: providing a releasing sheet which has a plurality of pattern cavities defined therein; providing a first P.U. liquid which is scraping resistant and strong solvent resistant; coating the first P.U. liquid on the releasing sheet to fill the pattern cavities of the releasing sheet with the first P.U. liquid; baking and drying the first P.U. liquid to form a first P.U. surface layer on the releasing sheet; providing a second weak solvent P.U. liquid; coating the second weak solvent P.U. liquid on the first P.U. surface layer; baking and drying the second weak solvent P.U. liquid to form a second P.U. surface layer on the first P.U. surface layer; providing a bonding agent on the second P.U. surface layer; providing a substrate cloth on the bonding agent; and baking and drying the bonding agent so that the substrate cloth is securely bonded on the second P.U. surface layer through the bonding agent, thereby forming a first product which includes the first P.U. surface layer, the second P.U. surface layer, the bonding agent, and the substrate cloth.

The rear stage working includes the steps of: providing a first mixing liquid to be rolled and printed on the first product for performing a surface treatment of a first printing plate so as to form a plurality of intensive small air vents in the second P.U. surface layer for increasing permeability of the second P.U. surface layer; providing a second mixing liquid containing a fluoride to be rolled and printed on the first product for performing a surface treatment of a second printing plate so that the fluoride infiltrates through the first P.U. surface layer and the second P.U. surface layer for increasing a water repellent function of the first P.U. surface layer; and providing a third mixing liquid containing a P.U. solvent to be rolled and printed on the first product for performing a surface treatment of a third printing plate so as to increase comfort and quality of the first product, thereby making a final synthetic cloth product.

A primary, objective of the present invention is to provide a method which uses a transfer coating process to achieve a front stage working to form various patterns. The front stage working includes two coating steps, wherein the first coating step includes coating a scraping resistant and strong solvent resistant first P.U. liquid on the releasing sheet to form a first P.U. surface layer, and the second coating step includes coating a second weak solvent P.U. liquid on the first P.U. surface layer to form a second P.U. surface layer. The method also includes a rear stage working which uses a strong solvent made of D.M.F. to form a plurality of intensive small air vents in the second P.U. surface layer, wherein the transfer patterns printed by the first P.U. surface layer will not be broken.

Another objective of the present invention is to enhance the gas permeability and wetting ability of the synthetic cloth product by means of the intensive small air vents formed in the second P.U. surface layer.

A further objective of the present invention is to enhance the water repellent and waterproof effect of the synthetic cloth product by means of the fluoride.

A further objective of the present invention is to enhance the quality and comfort of the synthetic cloth product by means of the anti-blocking agent, the surfactant of wax type, and the surfactant of mat and bright.

Further benefits and advantages of the present invention will become apparent after a careful reading of the detailed description with appropriate reference to the accompanying drawings.

BRIEF DESCRIPTION OF THE DRAWINGS

FIG. 1 is a flow chart of a conventional dry type direct coating method for manufacturing a synthetic cloth in accordance with the prior art;

FIG. 2 is a cross-sectional view of the synthetic cloth produced by the conventional method as shown in FIG. 1;

FIG. 3 is a flow chart of a conventional wet type transfer coating method for manufacturing a synthetic cloth in accordance with the prior art;

FIG. 5 is a flow chart of a front stage working a method for making a P.U. synthetic cloth product in accordance with the present invention;

FIG. 5A is a cross-sectional view of a first P.U. surface layer of the front stage working processed by the method as shown in FIG. 5;

FIG. 5B is a cross-sectional view of a first P.U. surface layer of the front stage working processed by the method as shown in FIG. 5;

DETAILED DESCRIPTION OF THE INVENTION

Figure 4:
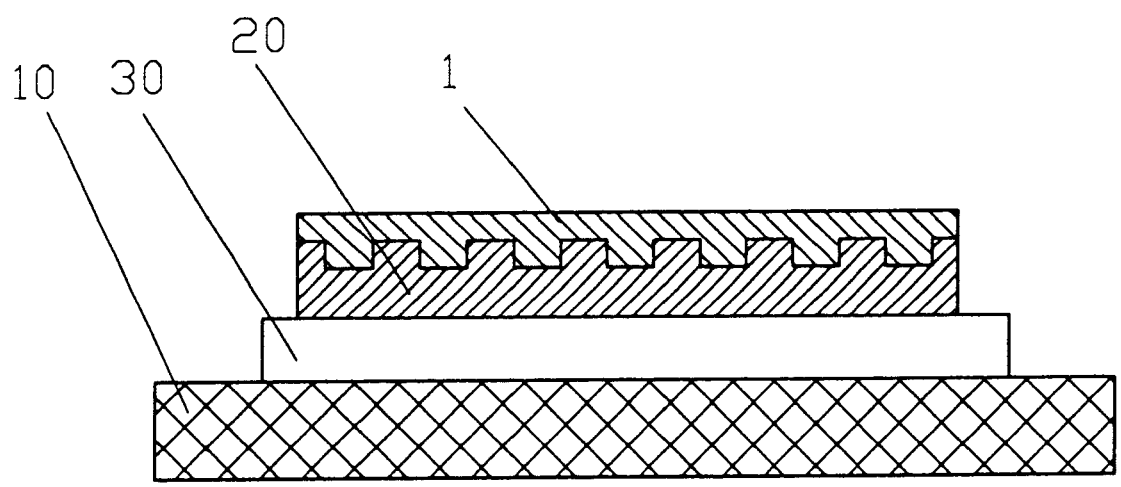
FIG. 4 is a cross-sectional view of the synthetic cloth produced by the conventional method as shown in FIG. 3.
Figure 5C:
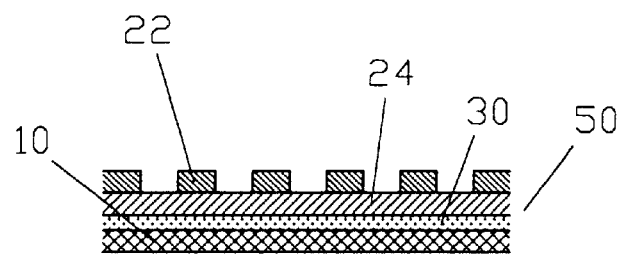
FIG. 5C is a cross-sectional view of a semi-product of the front stage working processed by the method as shown in FIG. 5.
Figure 5D:
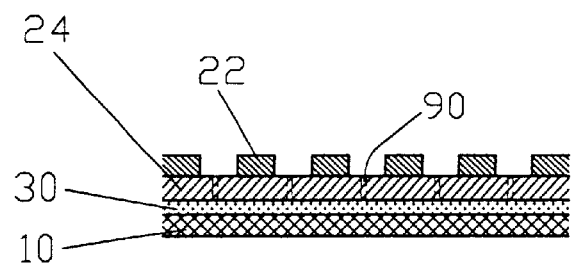
FIG. 5D is a cross-sectional view of the semi-product of a rear stage working processed by the method as shown in FIG. 5.
Figure 5E:
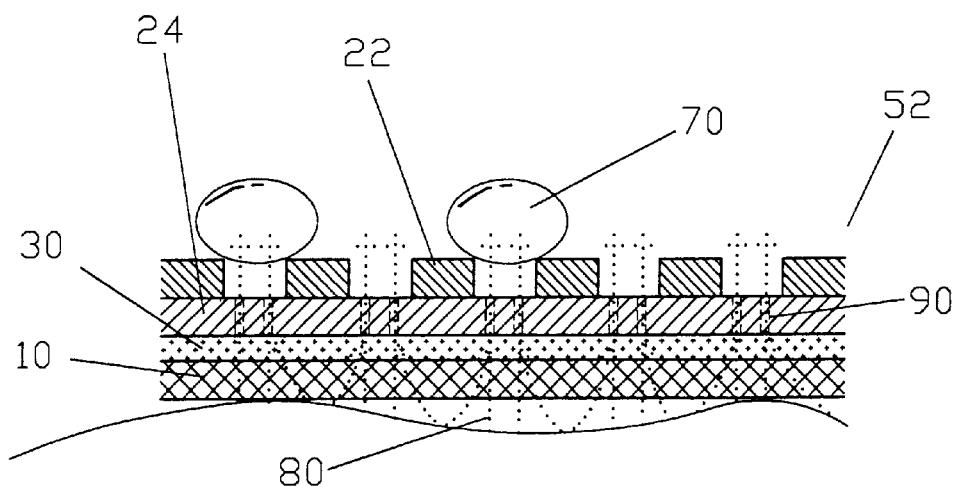
FIG. 5E is a cross-sectional view of a final synthetic cloth product of the rear stage working processed by the method as shown in FIG. 5.
Figure 6:
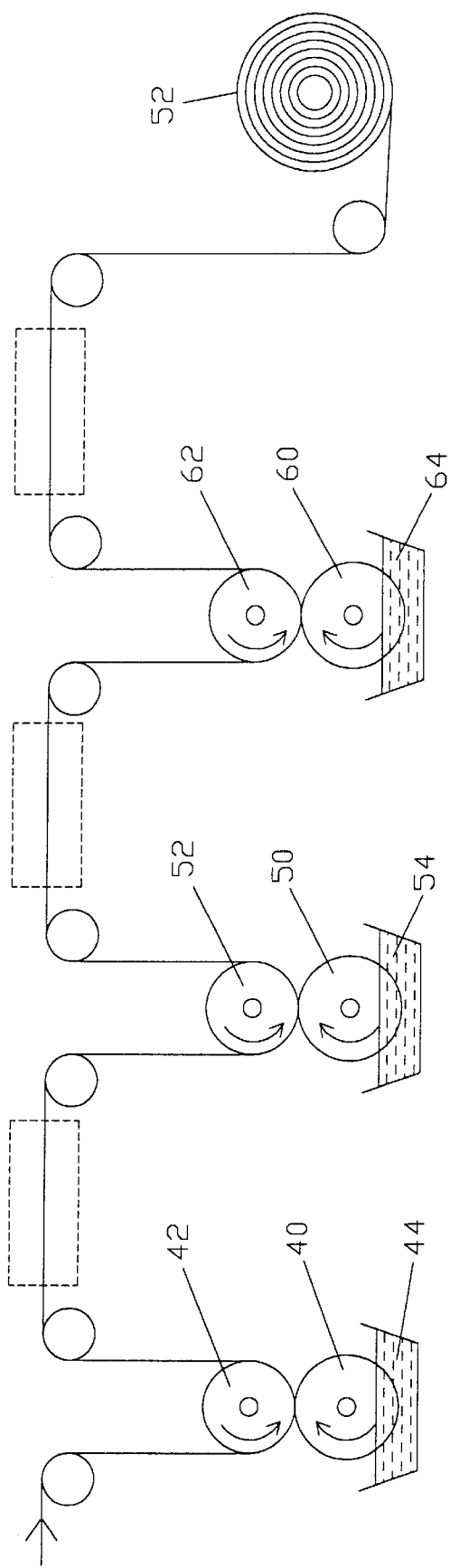
FIG. 6 is a flow chart of the rear stage working of the method in accordance with the present invention.

Referring to FIGS. 5 and 6, a method in accordance with the present invention is used for manufacturing a polyurethane (P.U.) synthetic cloth product with high wetting ability, gas permeability and high water repellent ability by means of a dry transfer coating process.

The method essentially comprises a front stage working as shown in FIG. 5, and a rear stage working as shown in FIG. 6.

As shown in FIG. 5, the front stage working includes the following steps.

First, a releasing sheet 1 is provided which hag a plurality of pattern cavities 12 defined therein, and a first P.U. liquid 221 is provided which is scraping resistant and strong solvent resistant.

Then, the first P.U. liquid 221 is coated on the releasing sheet 1 to fill the pattern cavities 12 of the releasing sheet 1 with the first P.U. liquid 221. The step of coating the first P.U. liquid 221 on the releasing sheet 1 includes using a pointed coating knife so as to control an amount of coating ranged between 30 g/y and 60 g/y.

The first P.U. liquid 221 is then baked and dried to form a first P.U. surface layer 22 on the releasing sheet 1 as shown in FIG. 5A, wherein the first P.U. surface layer 22 has patterns of transfer coated thereon.

Then, a second weak solvent P.U. liquid 241 is provided and coated on the first P.U. surface layer 22. The step of coating the second weak solvent P.U. liquid 241 on the first P.U. surface layer 22 includes using a circular coating knife so as to control an amount of coating ranged between 120 g/y and 150 g/y.

The second weak solvent P.U. liquid 241 is then baked and dried to form a second P.U. surface layer 24 on the first P.U. surface layer 22 as shown in FIG. 5B.

Then, a bonding agent 30 is bonded on the second P.U. surface layer 24, and a substrate cloth 10 is then mounted and bonded on the bonding agent 30 as shown in FIG. 5. The bonding agent 30 is then baked and dried so that the substrate cloth 10 is securely bonded on the second P.U. surface layer 24 through the bonding agent 30.

The releasing sheet 1 is then removed from the first P.U. surface layer 22 and the second P.U. surface layer 24, thereby forming a first product 50 which includes the first P.U. surface layer 22, the second P.U. surface layer 24, the bonding agent 30, and the substrate cloth 10 as shown in FIG. 5C. the first product 50 is then wound into a roll as shown in FIG. 5.

As show in FIG. 6, the rear stage working includes the following steps.

First, the first product 50 is rolled and printed between a meshed roller 40 and a rubber wheel 42, and a first mixing liquid 44 is coated on the roller 40 so that the first mixing liquid 44 can be rolled and printed on the first product 50 for performing a surface treatment of a first printing plate so as to form a plurality of intensive small air vents 90 in the second P.U. surface layer 24 as shown in FIG. 5D for increasing permeability of the second P.U. surface layer 24;

The first mixing liquid 44 contains P.U. ranged between 10% and 20%, and a strong solvent ranged between 90% and 80%. The strong solvent of the first mixing liquid 44 is dimethyl formamide (D.M.F.) for forming a plurality of intensive small air vents 90 in the second P.U. surface layer 24, thereby increasing the permeability of the second P.U. surface layer 24. The first P.U. surface layer 22 is formed by the first P.U. liquid 221 which is scraping resistant and strong solvent resistant so that the first P.U. surface layer 22 will not be broken by the strong solvent so as to maintain its patterns of transfer. Then, the first mixing liquid 44 on the first product 50 is baked and dried, thereby achieving the surface treatment of a net plate printing of the first printing plate. It is to be noted that the first mixing liquid 44 has a viscosity controlled at a condition of 100±30 C.P.S./25° C.

Then, the first product 50 is rolled and printed between a meshed roller 50 and a rubber wheel 52, and a second mixing liquid 54 containing a fluoride is coated on the roller 50 so that the second mixing liquid 54 can be rolled and printed on the first product 50 for performing a surface treatment of a second printing plate so that the fluoride infiltrates between the first P.U. surface layer 22, the second P.U. surface layer 24 and the substrate cloth 10 for increasing a water repellent function of the first P.U. surface layer 22, thereby preventing droplets 70 from attaching on the surface of the first P.U. surface layer 22 and infiltrating into the substrate cloth 10 as shown in FIG. 5E so as to achieve a waterproof effect.

Then, the second mixing liquid 54 on the first product 50 is baked and dried, thereby achieving the surface treatment of a net plate printing of the second printing plate.

The second mixing liquid 54 contains fluoride ranged between 1% and 5%, and a solvent ranged between 99% and 95%. The second mixing liquid 54 has a viscosity controlled at a condition ranged between 70 C.P.S./25° C. and 50 C.P.S./25° C.

Then, the first product 50 is rolled and printed between a roller 60 and a rubber wheel 62, and a third mixing liquid 64 containing a P.U. solvent is coated on the roller 60 so that the third mixing liquid 64 can be rolled and printed on the first product 50 for performing a surface treatment of a third printing plate so as to increase comfort and quality of the first product 50. The third mixing liquid 64 on the first product 50 is then baked and dried, thereby making and producing a final synthetic cloth product 52 as shown in FIG. 5E. The final product 52 is then wound into a roll as shown in FIG. 6.

The P.U. solvent of the third mixing liquid 64 contains an anti-blocking agent ranged between 10% and 20%, a surfactant of wax type ranged between 70% and 80%, and a surfactant of mat and bright ranged between 2% and 10%, which are mixed and stirred with each other for increasing comfort and quality of the first product 50 and the final synthetic cloth product 52. It is to be noted that the third mixing liquid 64 has a viscosity controlled at a condition ranged between 150 C.P.S./25° C. and 50 C.P.S. 25° C.

In the rolling and printing processes of the first printing plate, the second printing and the third printing plate of the rear stage working, the amount of coating is ranged between 30 g/y and 60 g/y, the temperature of heating is ranged between 140° C. and 150° C. during a period of time of two to three (2–3) minutes.

As shown in FIG. 5E, the moisture 80 from the human body can be easily drained outward to the ambient environment through the intensive small air vents 90 in the second P.U. surface layer 24, thereby increasing the gas permeability of the synthetic cloth product 52 so as to achieve a gas permeable effect. The wetting ability of the second P.U. surface layer 24 can reach 3500 g/SQMD.

In addition, the fluoride contained in the first P.U. surface layer 22 can is used for increasing the water repellent function of the synthetic cloth product 52 so as to repel the droplets 70, thereby preventing the droplets 70 from attaching on the surface of the first P.U. surface layer 22 and infiltrating into the small air vents 90 in the second P.U. surface layer 24 so as to achieve a waterproof effect.

It should be clear to those skilled in the art that further embodiments may be made without departing from the scope of the present invention.

What is claimed is:

1. A method for manufacturing a polyurethane (P.U.) product with high wetting ability, gas permeability and high water repellent ability by means of a dry transfer coating process, said method comprising the steps of:
   (a) a front stage working including the steps of:
      providing a releasing sheet (1) which has a plurality of pattern cavities (12) defined therein;
      providing a first P.U. liquid (221) which is scraping resistant and strong solvent resistant;
      coating said first P.U. liquid (221) on said releasing sheet (1) to fill said pattern cavities (12) of said releasing sheet (1) with said first P.U. liquid (221);
      baking and drying said first P.U. liquid (221) to form a first P.U. surface layer (22) on said releasing sheet (1);
      providing a second weak solvent P.U. liquid (241);
      coating said second weak solvent P.U. liquid (241) on said first P.U. surface layer (22);
      baking and drying said second weak solvent P.U. liquid (241) to form a second P.U. surface layer (24) on said first P.U. surface layer (22);
      providing a bonding agent (30) on said second P.U. surface layer (24);
      providing a substrate cloth (10) on said bonding agent (30); and
      baking and drying said bonding agent (30) so that said substrate cloth (10) is securely bonded on said second P.U. surface layer (24) through said bonding agent (30), thereby forming a first product (50) which includes said first P.U. surface layer (22), said second P.U. surface layer (24), said bonding agent (30), and said substrate cloth (10);
   (b) a rear stage working including the steps of:
      providing a first mixing liquid (44) to be rolled and printed on said first product (50) for performing a surface treatment of a first printing plate so as to form a plurality of intensive small air vents (90) in said second P.U. surface layer (24) for increasing permeability of said second P.U. surface layer (24);
      providing a second mixing liquid (54) containing a fluoride to be rolled and printed on said first product (50) for performing a surface treatment of a second printing plate so that said fluoride infiltrates through said first P.U. surface layer (22) and said second P.U. surface layer (24) for increasing a water repellent function of said first P.U. surface layer (22); and
      providing a third mixing liquid (64) containing a P.U. solvent to be rolled and printed on said first product (50) for performing a surface treatment of a third printing plate so as to increase comfort and quality of said first product (50), thereby making a final product (52).

2. The method in accordance with claim 1, wherein said first mixing liquid (44) contains P.U. ranged between 10% and 20%, and a strong solvent ranged between 90% and 80%.

3. The method in accordance with claim 2, wherein said strong solvent of said first mixing liquid (44) is dimethyl formamide (D.M.F.).

4. The method in accordance with claim 1, wherein said first mixing liquid (44) has a viscosity controlled at a condition of 100±30 C.P.S./25° C.

5. The method in accordance with claim 1 wherein said first mixing liquid (44) is rolled and printed between a meshed roller (40) and a rubber wheel (42).

6. The method in accordance with claim 1, further comprising baking and drying said first mixing liquid (44) on said first product (50).

7. The method in accordance with claim 1, wherein said second mixing liquid (54) contains fluoride ranged between 1% and 5%, and a solvent ranged between 99% and 95%.

8. The method in accordance with claim 1, wherein said second mixing liquid (54) has a viscosity controlled at a condition ranged between 70 C.P.S./25° C. and 50 C.P.S./25° C.

9. The method in accordance with claim 1, wherein said second mixing liquid (54) is rolled and printed between a meshed roller (50) and a rubber wheel (52).

10. The method in accordance with claim 1, further comprising baking and drying said second mixing liquid (54) on said first product (50).

11. The method in accordance with claim 1, wherein said P.U. solvent of said third mixing liquid (64) contains an anti-blocking agent, a surfactant of wax type, and a surfactant of mat and bright for increasing comfort and quality of said first product (50).

12. The method in accordance with claim 1, wherein said third mixing liquid (64) is rolled and printed between a roller (60) and a rubber wheel (62).

13. The method in accordance with claim 1, further comprising baking and drying said third mixing liquid (64) on said first product (50).

14. The method in accordance with claim 1, wherein said step of coating said first P.U. liquid (221) on said releasing sheet (1) includes using a pointed coating knife so as to control an amount of coating ranged between 30 g/y and 60 g/y.

15. The method in accordance with claim 1, wherein said step of coating said second weak solvent P.U. liquid (241) on said first P.U. surface layer (22) includes using a circular coating knife so as to control an amount of coating ranged between 120 g/y and 150 g/y.

* * * * *